United States Patent [19]

Ushikubo

[11] Patent Number: 5,044,414
[45] Date of Patent: Sep. 3, 1991

[54] PNEUMATIC TIRE WITH DIRECTIONAL TREAD

[75] Inventor: Hisao Ushikubo, Kodaira, Japan

[73] Assignee: Bridgestone Corporation, Tokyo, Japan

[21] Appl. No.: 467,425

[22] Filed: Jan. 19, 1990

[30] Foreign Application Priority Data

May 15, 1989 [JP] Japan ................. 1-118791

[51] Int. Cl.$^5$ ............................... B60C 11/04
[52] U.S. Cl. ................................ 152/209 R
[58] Field of Search .............. 152/209 R, 209 B

[56] References Cited

U.S. PATENT DOCUMENTS

| 4,177,850 | 12/1979 | Ogawa et al. | 152/209 R |
| 4,284,115 | 8/1981 | Ohnishi . | |
| 4,299,264 | 11/1981 | Williams . | |
| 4,732,194 | 3/1988 | Saneto et al. | 152/209 B |
| 4,819,704 | 4/1989 | Misawa et al. | 152/209 R |
| 4,877,072 | 10/1989 | Fontaine | 152/209 R |

FOREIGN PATENT DOCUMENTS

| 0153899 | 9/1985 | European Pat. Off. . | |
| 976062 | 11/1964 | United Kingdom | 152/209 B |
| 1195241 | 6/1970 | United Kingdom . | |

Primary Examiner—Michael W. Ball
Assistant Examiner—Mark A. Osele
Attorney, Agent, or Firm—Sughrue, Mion, Zinn, Macpeak & Seas

[57] ABSTRACT

To improve high-speed durability of the pneumatic tire formed with a directional tread such that transversal grooves are arranged into a herringbone pattern at regular intervals along the tire circumferential direction, the U-shaped cross section of each of the transversal grooves is formed in such a way that a radius ($R_1$) of curvature of a step-out side corner between a side wall and a bottom of each transversal groove which is first brought into contact with the ground along a tire rotating direction is determined smaller than that ($R_2$) of a kick-out side corner therebetween which is afterward brought into contact with the ground at a ratio of about 2 to 5.

6 Claims, 2 Drawing Sheets

PNEUMATIC TIRE WITH DIRECTIONAL TREAD

BACKGROUND OF THE INVENTION

1. Field of the Invention

The present invention relates to a pneumatic tire provided with a directional or unidirectional tread. In the directional tread tire, the tire is mounted on a rim under consideration of the directional pattern formed on the crown portion of the tire tread.

2. Description of the Prior Art

Recently, pneumatic tires provided with a directional tread have been proposed in order to improve drainage performance, in particular at high speed travelling.

In the prior-art pneumatic tires provided with a directional tread, the tread is divided into a number of blocks by a plurality of circumferential grooves arranged in parallel to the tire circumferential direction, and a plurality of U-shaped cross-section transversal grooves arranged at regular intervals in a herringbone pattern along the tire circumference in such a way as to extend from the central tread area to both the tread side areas at an inclination angle with respect to the tread circumference direction.

In the prior-art tire as shown in FIG. 2(B), however, the cross section of each of the transversal grooves is formed into a U-shape in such a way that the inclination angles $\theta_1$ and $\theta_2$ of both the groove walls with respect to the tire radial direction and the radii $R_1$ and $R_2$ of the curvature of groove bottom corners 2A and 2B are formed equal to each other in symmetry on both the front and rear sides along the tire rotating direction. In other words, in the prior-art tire as described above, the tire rotating direction is determined in such a way that the tread central portions of the transversal grooves are first brought into contact with the ground and thereafter both the tread side portions thereof are brought into contact with the ground to improve drainage performance in dependence upon the directional herringbone pattern.

In the above-mentioned prior-art tire, although there exists no problem at low and medium speed, however, when the tire is rotated at high speed of 250 km/h or more, there exists a problem in that cracks are readily produced at the groove bottom corners of the transversal grooves and therefore the blocks 3 are easily broken off, thus reducing the tire life. This is because a large shock or load is first applied to the groove bottom corner 2A of the step-out side (first brought into contact with the ground) along the circumferential direction of the blocks 3, so that a large strain is produced at the groove bottom corner 2B of the kick-out side (afterward brought into contact with the ground) when seen in the cross section of the transversal groove 2 as shown in FIG. 2(B), thus reducing the tire life.

SUMMARY OF THE INVENTION

With these problems in mind, therefore, it is the primary object of the present invention to provide a pneumatic tire provided with a directional tread whose high speed durability can be improved.

To achieve the above-mentioned object, the present invention provides the pneumatic radial tire provided with a directional tread located at a crown portion of a toroidal casing and formed with a plurality of blocks partitioned by a plurality of circumferential grooves and a plurality of generally U-shaped cross-section transversal grooves arranged into a herringbone pattern at approximately regular intervals along a tire circumferential direction in such a way as to extend from near a tread central area to both tread side areas at an inclination angle with respect to the tread circumferential direction, the tire rotational direction being determined in such a way that a tread central portion of each of the transversal grooves is first brought into contact with the ground and thereafter both tread side portions thereof are brought into contact with the ground, wherein the U-shaped cross-section of each of said transversal grooves is formed in such a way that a radius ($R_1$) of curvature of a step-out side corner between a side wall and a bottom of each transversal groove which is first brought into contact with the ground along a tire rotating direction is determined smaller than that ($R_2$) of a kick-out side corner therebetween which is afterward brought into contact with the ground.

The above ratio $R_2/R_1$ of radius of curvature of the two corners between the walls and the bottom in each U-shaped transversal groove cross section is from 2:1 to 5:1. Further, it is preferable that the U-shaped cross-section of the transversal grooves is formed in such a way that an inclination angle $\theta_1$ with respect to a tire radial direction of the step-out side wall is determined to be smaller than that $\theta_2$ of the kick-out side wall.

Further, it is not necessarily required that all the transversal grooves are formed with the U-shaped cross section and located in mirror symmetry with respect to the central circumferential groove. Further, the circumferential grooves and/or the transversal grooves are formed in straight lines or zigzag lines.

In the tire according to the present invention, since the corner shapes between the groove walls and the groove bottom of each transversal grooves are formed in such a way that the radius of curvature of the kick-out side (afterward brought into contact with the ground) is determined larger than that of the step-out side (first brought into contact with the ground), it is possible to reduce the stress concentration at the groove bottoms of the transversal grooves during tire rotation. Therefore thus effectively prevents crack generation thereat at high speed travelling without deteriorating the drainage performance, thus improving the speed durability and maintaining a stable high speed travelling without block broken-off trouble.

BRIEF DESCRIPTION OF THE DRAWINGS

The features and advantages of the pneumatic radial tire according to the present invention will be more clearly appreciated from the following description of the preferred embodiments of the invention taken in conjunction with the accompanying drawings in which like reference numerals designates the same or similar elements throughout the figures thereof and in which.

DETAILED DESCRIPTION OF THE PREFERRED EMBODIMENTS

Embodiments of the tire according to the present invention will be described hereinbelow with reference to the attached drawings.

Figure 1:
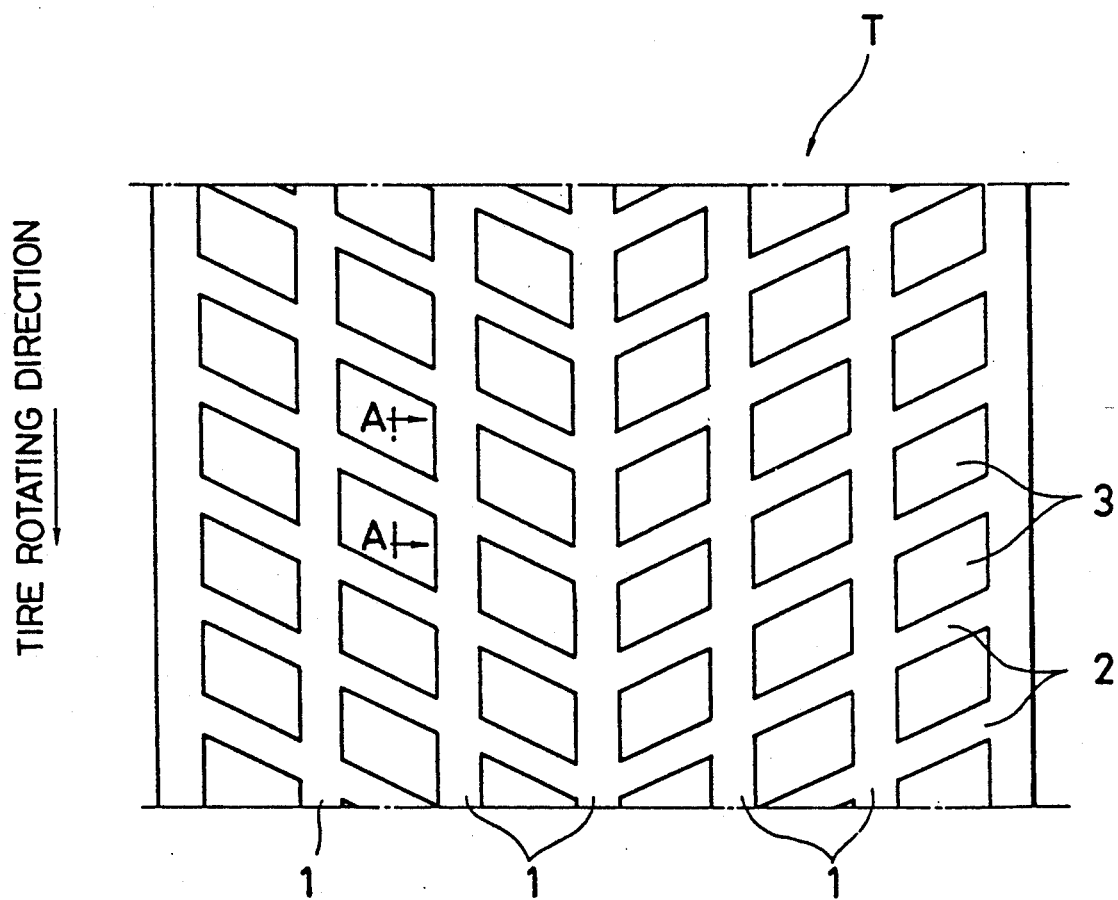
FIG. 1 is a development view showing a herringbone tread pattern of the tire according to the present invention.

In FIG. 1, although only the tread or the tread pattern is shown without showing elements or portions other than the tread, the tire of the present invention is formed in the same way as in the well-known tire structure composed of a radial carcass, a belt, etc.

The tread T is located at a crown portion of a toroidal casing, and formed with a plurality of parallel-arranged circumferential grooves 1 and a plurality of U-shaped cross-section transversal grooves 2 formed into a herringbone pattern by arranging the transversal grooves 2 at substantially regular intervals on the tire circumferential direction in such a way as to extend from the tread central area to both the tread side areas at an inclination angle with respect to a tread circumferential direction. A plurality of blocks 3 are partitioned by these circumferential grooves 1 and these inclined transversal grooves 2. Therefore, the tire rotational direction is determined so that the tread central area is first brought into contact with the ground and thereafter both the tread side areas are brought into contact with the ground during tire travel.

Here, although the tread T is usually formed of a relatively hard rubber, it is also possible to partially use a soft rubber or foamed rubber instead of the hard rubber. Further, the circumferential grooves 1 can be formed into a zigzag pattern (a transformed crank shape) instead of the straight circumferential grooves as shown. When other grooves (e.g. sipes) are formed, the circumferential grooves 1 can be formed with the maximum width and depth in the tire according to the present invention.

The transversal grooves 2 are formed into a herringbone pattern over the entire tread T being inclined at an average inclination angle of 50 to 70 degrees with respect to the tire central circumferential line. In the same way as in the circumferential grooves 1, the transversal grooves 2 can be also formed into a zigzag pattern (a transformed crank shape). The groove width and the depth of the transversal grooves 2 are equal to or smaller than those of the circumferential grooves 1.

Further, the apex of the herringbone pattern of each of the transversal grooves 2 is not necessarily located at the central circumferential groove as shown in FIG. 1, but can be dislocated or offset from the tire central line in asymmetrical positional relationship to each other.

Figure 2A:
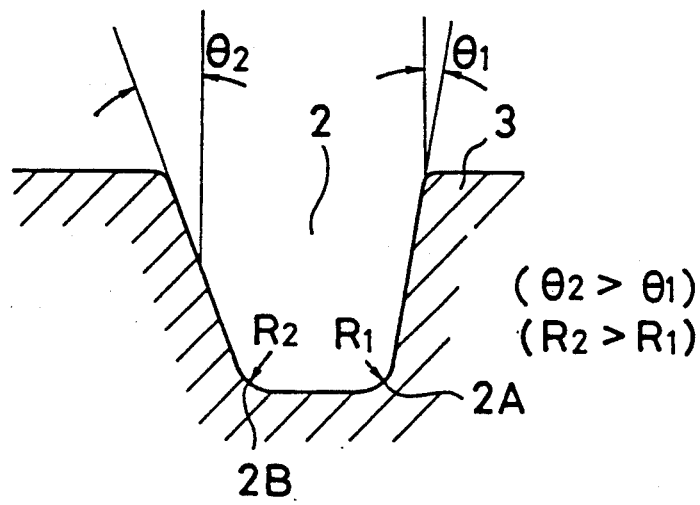
FIG. 2(A) is a cross-sectional view showing a transversal groove of the tire according to the present invention taken along the line A—A in FIG. 1.
Figure 2B:
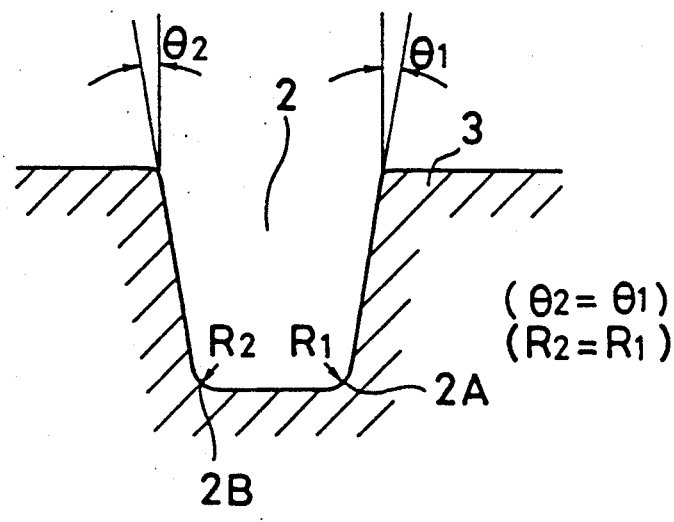
FIG. 2(B) is a similar cross-sectional view showing a transversal groove of the prior-art tire.

In the tire according to the present invention, as shown in FIG. 2(A), the corner between the wall and the bottom of each transversal groove 2 is formed into such a shape that the radius of curvature $R_1$ of the step-out side 2A (first brought into contact with the ground) is determined smaller than that $R_2$ of the kick-out side 2B (afterward brought into contact with the ground), preferably as a ratio of $R_2/R_1 = 2:1$ to $5:1$.

Further, it is also preferable that an inclination angle $\theta_1$ with respect to a tire radial direction of the step-out side wall is determined smaller than that $\theta_2$ of the kick-out side wall as shown in FIG. 2(A).

When the radius of curvature of the corner between the walls and the bottom of the transversal groove 2 is determined as described above, it is possible to reduce the stress concentration generated when the tire is rotated at high speed under load. Thus, cracks generated at the transversal groove bottoms can be prevented and therefore broken-off of the tire blocks due to the groove bottom cracks can be effectively prevented.

In contrast with the above-mentioned feature of the relationship ($R_1 < R_2$), if the radius of curvature of the kick-out side ($R_2$) is determined smaller than that of the step-out side ($R_1$), there arises a problem in that severe stress concentrates at the corners formed by the smaller radius $R_2$, the blocks 3 are easily heated causing trouble at high speed travel.

Further, although it is of course preferable to form all the transversal grooves 2 in the above-mentioned relationship $R_2 < R_2$ in the radius of curvature at the groove bottom corners, it is also possible to expect the same effect as described above by partially forming the transversal grooves 2 in the above-mentioned relationship $R_1 < R_2$ in only the blocks where cracks are easily or often produced.

The construction and the effects of the tires according to the present invention will be described hereinbelow on the basis of test results.

TEST EXAMPLES

The block patterns as shown in FIGS. 1 and 2(A) were formed on the tread T of test tires according to the present invention under the conditions as follows: tire size was 255/40 ZR 17; used rims was 9J × 17. The other construction and manufacturing conditions of the radial carcass, the belt layers, etc. except the above-mentioned tread portion were substantially the same as with the conventional tires and therefore further detailed description of them is omitted herein.

The dimensions of the block pattern of the invention tires as shown in FIG. 1 and 2(A) were as follows: the width of the tread T was 200 mm; the width of the circumferential grooves 1 was 10 mm; the depth thereof was 8 mm; the width of the transversal grooves 2 was 5 mm; the depth thereof was 8 mm; inclination angles $\theta_1$ and $\theta_2$ of the walls of each of the transversal grooves 2 were both 5 degrees; the step-out side $R_1$ was 1.0 mm; the kick-out side $R_2$ was 3.0 mm.

On the other hand, comparison tires manufactured under the same condition except $R_1 = R_2 = 1.0$ mm were prepared for comparison with the invention tires.

High speed travelling performance (high speed durability) of the above-mentioned test tires of two kinds was evaluated under the following conditions:

EVALUATION METHOD

The test tires were rotated on drums under load of 500 kg, inflation inner pressure of 3.0 kg/cm$^2$, at a speed of 100 km/h and at a distance of 500 km to evaluate the occurrence of cracks produced at the kick-out side groove bottoms 2B of the transversal grooves 2. The evaluation index obtained was 60 as compared with that 100 of the conventional tires, as listed in Table below. The smaller these indices are, the better will be the durability. Further, the evaluation of drainage performance, abrasion resistance and steering stability were omitted, because there exist no substantial differences in these characteristics between the invention and comparison tires.

TABLE

|  | Conventional tires | Invention tires |
| --- | --- | --- |
| High speed durability | 100 | 60 |

The above test results indicate that the tires according to the present invention can improve the high speed durability markedly.

As described above, in the tire according to the present invention, since the corners between the walls and the bottom of each of the transversal grooves is formed in such a way that the radius $R_2$ of curvature on the following contact side with the ground is determined larger than that $R_1$ thereof on the first contact side with the ground, it is possible to reduce the stress concentration at the bottoms of the transversal grooves during tire rotation at high speed under load, and therefore to effectively prevent the occurrence of cracks at high speed travelling.

Therefore, the tire according to the present invention provides an excellent high speed durability in addition to excellent drainage performance, and therefore maintains a stable high speed travelling without occurrence of block broken-off trouble at high speed travelling.

What is claimed is:

1. A pneumatic tire for high speed passenger cars comprising; a directional tread located at a crown portion of a toroidal casing and formed with a plurality of blocks partitioned by a plurality of circumferential grooves, a plurality of U-shaped cross-section transversal grooves arranged into a herringbone pattern at substantially regular intervals along a tire circumferential direction in such a way as to extend from near a tread central area to both tread side areas at an inclination angle with respect to the tread circumferential direction, the tire rotational direction being determined in such a way that a tread central portion of each of the transversal grooves is first brought into contact with the ground, wherein the U-shaped cross-section of each of said transversal grooves is formed in such a way that a radius ($R_1$) of curvature of a step-out side corner between a side wall and a bottom of each transversal groove which is first brought into contact with the ground along a tire rotating direction is determined smaller than that ($R_2$) of a kick-out side corner therebetween which is afterward brought into contact with the ground, a ratio $R_2/R_1$ of radius of curvature is in the range of 2:1 to 5:1, and the U-shaped cross-section of some of said transversal grooves is formed in such a way that an inclination angle ($\theta_1$) with respect to a tire radial direction of the step-out side wall which is first brought into contact with the ground is determined preferably smaller than that ($\theta_2$) of the kick-out side wall which is afterward brought into contact with the ground.

2. The pneumatic tire of claim 1, wherein apices of the transversal grooves are all located at a center of the tire crown portion in mirror symmetry with respect to a central circumferential groove on the tire crown portion.

3. The pneumatic tire of claim 1, wherein apices of the transversal grooves are dislocated from a center of the tire crown portion in asymmetry with respect to a central circumferential groove on the tire crown portion.

4. The pneumatic tire of claim 1, wherein the transversal grooves are formed in straight lines at an inclination angle from 50 to 70 degrees with respect to the tire circumferential direction.

5. The pneumatic tire of claim 1, wherein the circumferential grooves are formed in straight lines.

6. The pneumatic tire of claim 1, wherein the circumferential grooves are formed in zigzag lines.

* * * * *